United States Patent
Inan et al.

(10) Patent No.: US 10,781,614 B2
(45) Date of Patent: Sep. 22, 2020

(54) SAFETY DEVICE FOR A MOTOR VEHICLE, HAVING A ROTARY LATCH AND A PROTECTIVE POSITION

(71) Applicant: Kiekert AG, Heiligenhaus (DE)

(72) Inventors: Ömer Inan, Dorsten (DE); Holger Schiffer, Meerbusch (DE); Michael Scholz, Essen (DE); Thomas Schönenberg, Burscheid (DE)

(73) Assignee: Kiekert AG, Heiligenhaus (DE)

( * ) Notice: Subject to any disclaimer, the term of this patent is extended or adjusted under 35 U.S.C. 154(b) by 117 days.

(21) Appl. No.: 16/065,139

(22) PCT Filed: Nov. 28, 2016

(86) PCT No.: PCT/DE2016/100556
§ 371 (c)(1),
(2) Date: Jul. 19, 2018

(87) PCT Pub. No.: WO2017/108023
PCT Pub. Date: Jun. 29, 2017

(65) Prior Publication Data
US 2018/0371804 A1    Dec. 27, 2018

(30) Foreign Application Priority Data

Dec. 22, 2015 (DE) .................. 10 2015 122 579

(51) Int. Cl.
*B60J 7/00* (2006.01)
*E05B 77/08* (2014.01)
(Continued)

(52) U.S. Cl.
CPC ............. *E05B 77/08* (2013.01); *B60R 21/38* (2013.01); *E05B 83/24* (2013.01);
(Continued)

(58) Field of Classification Search
CPC .......... G03B 17/42; G03B 9/58; G03B 17/26; G03B 19/18; F42C 15/295; E05B 81/20;
(Continued)

(56) References Cited

U.S. PATENT DOCUMENTS 3,006,683 A * 10/1961 Smith ..................... E05D 3/147
49/248
3,800,711 A * 4/1974 Tuttle ....................... B61D 7/28
105/251
(Continued)

FOREIGN PATENT DOCUMENTS

DE    102006026282      12/2007
DE    102010037937 A1   4/2012
(Continued)

OTHER PUBLICATIONS

International Search Report and Written Opinion for corresponding Patent Application No. PCT/DE2016/100556 dated Mar. 27, 2017.

*Primary Examiner* — Kiran B Patel
(74) *Attorney, Agent, or Firm* — Renner, Otto, Boisselle & Sklar, LLP

(57) ABSTRACT

A safety device for a motor vehicle, which has a striker, a pawl, a rotary latch having an opening direction of rotation, a closing direction of rotation, and a main locking position, and preferably a front hood, wherein the safety device has a blocking element, which has a blockage position and a release position, and the rotary latch is blocked in the closing direction of rotation in the blockage position of the blocking element, wherein the rotary latch is released in the closing direction of rotation by the blocking element in the release position of the blocking element and lowering of the striker is enabled in the main locking position of the rotary latch and movement of the blocking element from the release position to the blockage position is controlled by means of the pawl.

10 Claims, 4 Drawing Sheets

Figure 1A:
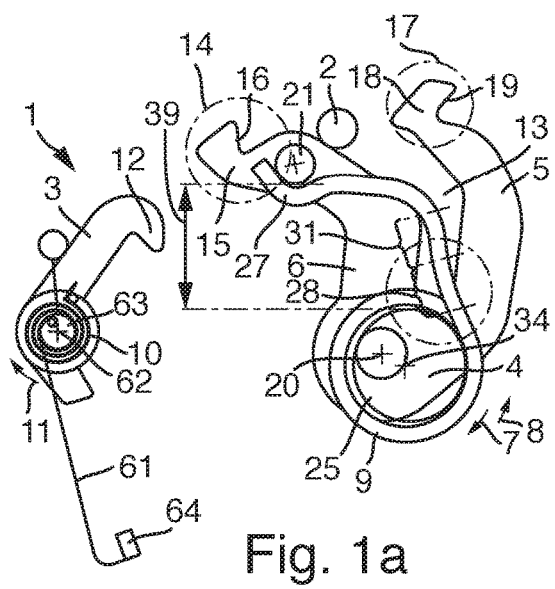

(51) Int. Cl.
*E05B 83/24* (2014.01)
*B60R 21/38* (2011.01)
*E05B 15/04* (2006.01)
*E05B 17/00* (2006.01)
*E05B 83/16* (2014.01)
*E05B 85/26* (2014.01)

(52) U.S. Cl.
CPC ........... *E05B 17/0037* (2013.01); *E05B 83/16* (2013.01); *E05B 85/26* (2013.01); *E05B 2015/0486* (2013.01)

(58) Field of Classification Search
CPC ...... E05B 81/14; E05C 3/24; Y10T 292/1047; Y10T 292/1082
See application file for complete search history.

(56) References Cited

U.S. PATENT DOCUMENTS

| | | | | |
|---|---|---|---|---|
| 3,805,708 | A * | 4/1974 | Schuller | B61D 7/18 105/251 |
| 3,833,240 | A * | 9/1974 | Weiler | B60R 3/02 280/166 |
| 4,180,943 | A * | 1/1980 | Smith | B64C 1/1407 244/129.5 |
| 4,440,364 | A * | 4/1984 | Cone | B64C 1/24 16/282 |
| 4,828,317 | A * | 5/1989 | Muscat | B60J 7/1286 296/107.07 |
| 5,551,826 | A * | 9/1996 | Todd | B62D 33/067 180/89.14 |
| 6,179,546 | B1 | 1/2001 | Citrowske | A61G 3/06 414/543 |
| 6,382,705 | B1 * | 5/2002 | Lang | B60J 5/0479 296/146.12 |
| 6,386,613 | B1 * | 5/2002 | Vader | B60J 5/108 296/146.12 |
| 8,636,182 | B1 * | 1/2014 | Gordon | B60R 9/00 224/404 |
| 2002/0194705 | A1 * | 12/2002 | Liang | E05D 3/147 16/336 |
| 2004/0084929 | A1 * | 5/2004 | Neubrand | B60J 7/145 296/107.15 |
| 2006/0097542 | A1 * | 5/2006 | Dilluvio | B60J 7/0069 296/107.09 |
| 2006/0249978 | A1 * | 11/2006 | Roster | B60J 7/146 296/107.08 |
| 2007/0152473 | A1 * | 7/2007 | Lechkun | B60J 5/0479 296/146.12 |
| 2007/0176389 | A1 * | 8/2007 | VanBelle | B60R 3/02 280/166 |
| 2008/0106109 | A1 * | 5/2008 | Brown | B60R 7/04 296/37.7 |
| 2008/0196312 | A1 * | 8/2008 | Brown | E05F 17/004 49/334 |
| 2008/0296925 | A1 * | 12/2008 | Fallis, III | B60J 1/183 296/108 |
| 2010/0301629 | A1 * | 12/2010 | Fallis, III | B60J 7/146 296/108 |
| 2012/0119016 | A1 * | 5/2012 | Shaw | B64C 27/20 244/12.3 |
| 2012/0167842 | A1 * | 7/2012 | Zysk | F01P 3/18 123/41.05 |
| 2012/0318588 | A1 * | 12/2012 | Kroese | B60G 3/08 180/41 |
| 2015/0147144 | A1 * | 5/2015 | Frazier | B60P 1/43 414/495 |
| 2015/0343936 | A1 * | 12/2015 | Weiner | B60P 3/007 296/24.3 |
| 2016/0016656 | A1 * | 1/2016 | Thompson | B64D 1/06 49/400 |
| 2016/0122975 | A1 * | 5/2016 | Vanek | E02F 9/0891 180/69.2 |
| 2018/0044956 | A1 * | 2/2018 | Gerhardt | B60J 5/047 |
| 2018/0148957 | A1 * | 5/2018 | Och | E05B 81/76 |
| 2019/0135091 | A1 * | 5/2019 | Erhardt | E02F 9/163 |
| 2019/0210738 | A1 * | 7/2019 | Arany-Kovacs | B64C 1/1407 |
| 2019/0249471 | A1 * | 8/2019 | Patel | E05B 85/107 |

FOREIGN PATENT DOCUMENTS

| | | |
|---|---|---|
| DE | 102010061518 | 4/2012 |
| DE | 102010062700 A1 | 6/2012 |
| EP | 2341204 | 7/2011 |
| FR | 2488935 A1 | 2/1982 |
| KR | 20150106290 | 9/2015 |
| KR | 1020150106291 A | 9/2015 |
| WO | 2015077549 | 5/2015 |

* cited by examiner

SAFETY DEVICE FOR A MOTOR VEHICLE, HAVING A ROTARY LATCH AND A PROTECTIVE POSITION

The invention relates to a safety device for a motor vehicle which has a striker, a pawl and a rotary latch, having an opening direction of rotation, a closing direction of rotation and a main locking position.

Such a safety device is known from EP 2 096 007 B1 in the form of a pedestrian protection device. The pedestrian protection device has a sensor which can record an impact of an object with the motor vehicle and then transmit a signal to a device which moves the rear or front area of the front hood upwards into a protective position in which the front hood is braced in a vertical direction downwards elastically or attenuated. A pedestrian protective device in which a front hood is exposed upwards into a protective position is also known from DE 10 2005 035 006 A1. The pedestrian protective device described therein has lock components which, during lifting of the front hood into the protective position, fix the front hood on the pivotable lock carrier. With this device, an attenuation or even prevention of a swinging back of the front hood should be enabled after execution of the erection process before an impact of a pedestrian on the front hood.

EP 1818 224 A1 describes a pedestrian protective device in which the front hood is lifted by an actuator into an elevated protective position prior to impact by a pedestrian. In order to prevent oscillating movements of the front hood during lifting into the protective position, in one embodiment an elastic element is arranged in a lengthwise hole which is compressed by a pin and should work sapping energy. The invention described in EP 2 096 007 B1 is based inter alia on the objective of creating a pedestrian protective device which enables a more beneficial and quicker swinging of the front hood into the protective position.

The common element of all aforementioned pedestrian protective devices is that a front hood is lifted to reach a protective position. On the one hand, this comes along with a time delay, within which the front hood attains the protective position, and on the other hand a safety-impairing overshooting occurs if the front hood is very quickly lifted into the protective position. Both of these impair the safety of a person during an impact on the front hood.

The objective of the present invention is therefore to provide a safety device for a motor vehicle in which the safety of a person during an impact on a front hood of a motor vehicle is increased.

This objective is solved according to the invention by means of a safety device with the characteristics of the patent claim 1 and a procedure with the characteristics of the patent claims 9 and 11. Advantageous embodiments with expedient further designs of the invention result from the remaining patent claims, the description and the figures. In particular, one or several characteristics from the independent claim and the dependent claims can be supplemented and/or substituted by one or several characteristics from the description. One or several characteristics from different configurations of the invention in each case can also be associated with further designs of the invention.

In order to provide a safety device in which the safety of a person is increased during an impact on a front hood of a motor vehicle, a safety device for a motor vehicle is proposed which has a striker, a pawl and a rotary latch. The safety device preferably has a front hood on which the striker is attached in an installed state of the safety device. The rotary latch has an opening direction of rotation, a closing direction of rotation and a main locking position. Furthermore, the safety device has a blocking element with a blockage position and a release position. In the blockage position of the blocking element, the rotary latch is blocked in the closing direction of rotation. In the release position of the blocking element the rotary latch is released in the closing direction of rotation by the blocking element and enables lowering of the striker in the main locking position of the rotary latch. A movement of the blocking element from the release position into the blockage position is controlled by means of the pawl.

The rotary latch has a load arm and a catch arm, wherein the catch arm and the load arm form a fork-shaped infeed section of the rotary latch which accommodates the striker during a closure process of the rotary latch. The catch arm and the load arm respectively have a head area, wherein the two head areas are advantageously the areas of the rotary latch furthest from a pivot axis of the rotary latch. Both head areas form an opening of the infeed section which the striker enters into during the closure process of the rotary latch. The head areas can preferably extend to up to a fifth of a length of the catch arm or the load arm of the respective end of the catch arm or the load arm to the pivot axis of the rotary latch.

The load arm and the catch arm are preferably at least partly arch-shaped in order to enable guidance of the striker within the infeed section during a closure movement of the rotary latch.

The rotary latch has a main ratchet, where in the main locking position the pawl encompasses the main ratchet and blocks the rotary latch in the opening direction of rotation. An ejection spring of the safety device acts on the rotary latch in the opening direction of rotation and pushes the main ratchet against the pawl in the main locking position. The ejection spring is advantageously designed as a leg spring, which is bendingly stressed around its pivot axis.

In the main locking position of the rotary latch the safety device assumes a bolting position, where the striker and in particular the front hood is closed and bolted. In an open position of the rotary latch, the striker or the front hood arranged on the striker is released from the rotary latch. The opening direction of rotation of the rotary latch is the direction in which the rotary latch rotates from the main locking position to the open position. The closing direction of rotation is the direction of rotation opposite to the opening direction of rotation.

In the main locking position of the rotary latch, the striker or the front hood can be lowered, whereby in the main locking position of the rotary latch the safety device provides a protective position in which an impact of a person on the front hood can be absorbed in an attenuating manner. During absorption of the impact of the person the rotary latch rotates in the closing direction of rotation into an impact absorbing position in which the safety device also assumes an impact absorbing position. The advantage of the proposed safety device is that the safety device provides the protective position in the bolting position. Thus, a triggering mechanism to move the safety device into the protective position, for example an actuator to lift the front hood, can be dispensed with, whereby a time delay, within which the front hood reaches the protective position is considerably reduced or can even be reduced to up to zero seconds. Due to a reduction in this time delay, the proposed safety device can increase the safety of a person during an impact on the front hood of the motor vehicle. Furthermore, overshooting of the front hood can be prevented as the front hood does not need to be transferred from a normal position in the bolting position of the safety device into a lifted position in the form of a protective position of the safety device.

The movement of the blocking element from the release position into the blockage position is controlled by means of the pawl. Controlled means that a movement of the pawl causes the movement of the blocking element from the release position into the blockage position. This can be enabled, for example, by the pawl releasing the pre-tensioned blocking element in a movement that is preferably in the direction of the blockage position.

In a different design, the blocking element is driven by means of the pawl. The blocking element is preferably driven indirectly by means of the rotary latch and preferably directly by means of the pawl. Such an embodiment will be described hereafter. In this preferred embodiment, the pawl has a locking position in which the pawl prevents passing of the main ratchet of the rotary latch in the opening direction of rotation and a passing position in which the main ratchet can pass on the pawl.

Advantageously, the safety device has a pawl spring which acts on the pawl in a locking direction of rotation, i.e. in the direction of the locking position. If the rotary latch is in the open position and is pivoted from the open position in the closing direction of rotation, for example by means of pressing down of the front hood or the striker, the rotary latch preferably impacts on a latch nose of the pawl and rotates the pawl starting from the locking position in the direction of the passing position. The blocking element is preferably mechanically connected to the pawl such that during rotation of the pawl from the locking position in the direction of the passing position the pawl moves the blocking element from the release position into the blockage position. In an especially advantageous configuration, the blocking element and the pawl are pivotably accommodated around a common pivot axis. This can enable a more compact design of the safety device and associated saving of an additional pivot axis for the blocking element and thus weight saving. Furthermore, it can be provided for that the blocking element is directly connected to the pawl or is formed as a boom of the pawl.

The blocking element preferably has a stop on which the rotary latch impacts during rotation in the closing direction of rotation in the blockage position of the blocking element, where the rotary latch is preferably located behind the main locking position viewed in the closing direction of rotation. In the blockage position of the blocking element, the blocking element prevents rotation of the rotary latch in the closing direction of rotation beyond the stop and thus penetration of the rotary latch or the front hood, where the safety device assumes a penetrative protective position.

Penetration protection provided in the penetration protective position is advantageous in particular during closure of the front hood in which movement of the front hood is decelerated. Penetration protection is provided especially advantageously in the blockage position and lifted in the release position of the blocking element. In the release position of the blocking element, the striker or the front hood can be lowered by approximately 15 mm starting from the protective position of the safety device which enables absorption of an impact of a pedestrian on the front hood.

An advantageous design provides for the blocking element assuming the blockage position in a position of the rotary latch in which the rotary latch is rotated from the main locking position in the opening direction of rotation and the blocking element assumes the release position in the main locking position of the rotary latch.

This can be enabled especially advantageously by the safety device having a blocking spring element, where the blocking spring element causes delayed rotation of the blocking element in the closing direction of rotation in the blockage position. The blocking spring element can be a blocking element rotary spring, for example, or be formed as an elastic lever between the stop and the pivot axis of the blocking element. In the latter configuration, the elastic lever and the stop are respectively part of the blocking element. Within the scope of an especially preferred variant, the pawl drives the blocking element indirectly by means of the blocking spring element.

The delay in the rotation of the blocking element in the locking direction of rotation in particular causes a delay compared to a rotation of the pawl in the locking direction of rotation to the locking position, where the rotary latch is blocked in the closing direction of rotation by means of the blocking element. In order to achieve this delay in detail, the safety device especially advantageously has a tailored inertia system, whereby the blocking spring element, a mass inertia moment of the blocking element around the pivot axis of the blocking element, a mass inertia moment of the pawl around the pivot axis of the pawl and the pawl spring are tailored to one another such that the pawl has a higher pivot acceleration than the blocking element, starting from the passing position.

Especially advantageously, the safety device has an attenuation element in addition to the ejection spring which attenuates rotation of the rotary latch starting from the main locking position into the closing direction of rotation and assists springing and lowering of the striker or the front hood starting from the main locking position of the rotary latch. The safety device preferably provides for a pivot angle sector, in which the rotary latch can be rotated in the closing direction of rotation by means of the main locking position, where lowering of the striker or the front hood is associated with rotation of the rotary latch into the pivot angle sector.

An advantageous configuration provides for the rotary latch having a pre-ratchet position. A pre-ratchet is preferably formed on the catch arm, where the pawl clasps the pre-ratchet in the pre-locking position and blocks the rotary latch in the opening direction of rotation. In the pre-locking position of the rotary latch, the safety device secures the rotary latch against rotation into the opening direction of rotation, where the striker, which is surrounded by an infeed section of the rotary latch, is blocked into the opening direction. Consequently, the front hood is blocked in the opening direction. Such a securing of the front hood in the pre-locking position can prevent unintentional opening of the front hood if the rotary latch was accidentally loosened from the main locking position.

An especially advantageous configuration of the invention provides for the head area of the catch arm having a bending tangent with a latch surface as a pre-ratchet in the direction of the opening direction of rotation. The latch nose of the pawl lies in the pre-locking position of the rotary latch on this latch surface and clasps the bending tangent of the catch arm, whereby the pawl is acted on in a locking direction of rotation by means of a pawl spring of the safety device and assumes a locking position. Furthermore and first and foremost in combination with this configuration, a further configuration can provide for the head area of the load arm has a bending tangent with a latch surface as a main ratchet in the direction of the opening direction of rotation. In the main ratchet position of the rotary latch, the latch nose of the pawl lies adjacent to this latch surface, wherein the latch nose clasps the bending tangent of the load arm and the pawl assumes the locking position.

In particular, the combination of these two configurations enables the pawl to secure the rotary latch from rotating in the opening direction of rotation directly in the area of the opening of the infeed section, both in the pre-locking position and in the main locking position of the rotary latch.

As the respective head areas of the catch arm and the load arm are the furthest areas of the rotary latch from a pivot axis of the rotary latch and the pawl is latched in the bending tangent of the catch arm or the bending tangent of the load arm, the greatest possible torque effect of the pawl is provided for against an opening torque in the pre-locking position or in the main locking position.

Compared to safety devices in which the pawl cannot be latched directly in the area of an opening of the infeed section both in the pre-locking position and in the main locking position of the rotary latch, this has the advantage that the rotary latch does not need to extend in the areas distant from the opening of the infeed section in order to respectively form a latch surface to the latch nose of the pawl. For example, an external contour of the catch arm can fundamentally run parallel to an internal contour of the infeed section. This reduces the weight of the rotary latch and thus the overall weight of the safety device, whereby consumption of a motor vehicle in which the safety device can be installed can be reduced. A lower weight of the rotary latch can also reduce a mass inertia moment of the rotary latch around the pivot axis of the rotary latch which is associated with lesser inertia of the safety device. The lesser inertia of the safety device has the advantage that in the case of an impact of a person on the front hood, the striker can be lowered more quickly than in a safety device with a comparatively higher mass inertia moment of the rotary latch. This can, in particular, reduce a HIC value, i.e. a standardized integral value of a head acceleration of a person during impact. This special configuration can thus further increase the safety of the safety device.

The pawl spring and the ejection spring respectively have a spring stiffness, where in an especially advantageous configuration the spring stiffness of the pawl spring is adjusted to the spring stiffness of the ejection spring such that during release of the rotary latch from the main locking position, latching of the rotary latch into the pre-locking position is ensured. Especially preferably, the spring stiffness of the pawl spring is adjusted to the spring stiffness of the ejection spring, the mass inertia moment of the pawl around the pivot axis of the pawl, the mass inertia moment of the rotary latch around the pivot axis of the rotary latch and on a weight force of the front hood acting by means of the striker on the rotary latch, so that during release of the rotary latch from the main locking position the pawl experiences higher pivot acceleration than the rotary latch and latching of the rotary latch in the pre-locking position is ensured. Such an adjustment of the spring stiffness of the pawl spring enables the pawl to reach the locking position after release of the rotary latch from the main locking position more quickly than the rotary latch reaches the pre-ratchet position so that during unsecuring of the rotary latch from the main locking position latching into the pre-locking position is ensured.

Within the scope of a further configuration or in combination with the previous configuration, it is provided for that the safety device has a delay mechanism to delay the rotary latch. During rotation of the rotary latch in the opening direction of rotation starting from the main locking position, the delay mechanism ensures latching of the rotary latch in the pre-locking position. For example, the delay mechanism can be designed in the form of a friction surface which decelerates the rotary latch before reaching the pre-locking position. In this configuration, a longer period is available within which the pawl can reach the locking position before the rotary latch assumes the pre-locking position. The advantage of this embodiment is that adjustment of the spring stiffness of the pawl spring to the spring stiffness of the ejection spring can be dispensed with and nevertheless, during rotation of the rotary latch in the opening direction of rotation, latching of the rotary latch in the pre-locking position can be ensured starting from the main locking position. Thus, a pawl spring can be dimensioned smaller which also reduces the overall weight of the safety device.

Within the scope of a preferred variant, the delay mechanism has a stop surface to stop the rotary latch. The stop surface can be arranged on a boom of the pawl, for example, and interact with the bending tangent of the catch arm.

Equally, the stop surface on the catch arm can preferably be arranged on the bending tangent of the catch arm and interact with the boom of the pawl. A crucial element in this embodiment is that in the release position of the pawl a trajectory of a point on the catch arm furthest from the pivot axis of the rotary latch intersects the boom, i.e. the boom blocks the catch arm during rotation of the rotary latch from the main locking position into the pre-locking position in a position between the main locking position and the pre-locking position of the rotary latch. If the rotary latch is located in this position, this enables a movement of the pawl driven by the pawl spring from the release position to reaching of the locking position before the catch arm can pass the latch nose of the pawl.

An advantageous further formation provides for the ejection spring being formed as a spiral spring. This can enable in particular a narrower design of the safety device compared to a safety device in which the ejection spring is designed as a leg spring. The design of the ejection spring as a spiral spring can simplify in particular common accommodation of the rotary latch and the ejection spring on a common pivot axis, where this joint accommodation constitutes a further possible embodiment of the safety device. The narrower design of the ejection spring as a spiral spring is hereby advantageous in particular compared to a leg spring because bearings of a bearing pairing can be arranged closer for the common pivot axis and the pivot axis is thus of a shorter design, enabling a higher bearing load of the pivot axis in order to accommodate more than one component.

In an especially advantageous embodiment, it is provided for that the ejection spring has a leg to eject the striker and the leg in the main locking position of the rotary latch lies adjacent on the striker and in an intermediate position of the rotary latch in which the rotary latch is located between the main locking position and the open position, the leg acts on the rotary latch directly in the opening direction of rotation.

Ejection of the striker means that the striker is moved in such a way that after ejection the striker is released from the rotary latch, where the rotary latch is in the open position. In one embodiment, the ejection spring assists ejection of the striker at least partly, preferably at the start of ejection of the striker. Especially advantageously, the ejection spring drives the rotary latch initially indirectly by means of the striker and subsequently directly into the opening direction of rotation by means of a tappet arranged on the rotary latch during ejection of the striker. The tappet is preferably formed as a single component with the rotary latch and as a pin or mandrel, for example.

In a particular configuration, the leg lies directly on the striker in the main locking position of the rotary latch. Directly means in particular that no further component is provided for between the leg and the striker. A main spring material of the ejection spring which gives the ejection spring spring stiffness preferably lies adjacent to the striker in the main locking position of the rotary latch. The leg preferably extends at least to a radius of 3 to 5 cm, starting from the pivot axis of the ejection spring.

In the intermediate position of the rotary latch the rotary latch is rotated into the opening direction of rotation starting from the main locking position, preferably rotated by at least fifty to sixty degrees. Advantageously, the leg acts on the rotary latch in the opening direction of rotation in several intermediate positions of the rotary latch, where respective positions of the leg in the intermediate positions of the rotary latch form a circular sector which is located in the main locking position of the rotary latch in an opening direction of rotation starting from a leg position.

The ejection spring acts on the rotary latch directly in the intermediate position and indirectly by means of the striker into the opening direction of rotation in the main locking position, whereby preferably in every position of the leg contact exists between the striker and the infeed section of the rotary latch during movement of the rotary latch from the main locking position to the open position. This can advantageously reduce noise emissions of the safety device compared to a safety device in which permanent contact is not guaranteed between the striker and the infeed section.

Furthermore, due to the proposed safety device with the leg of the ejection spring an additional rotary latch spring to drive the rotary latch can be dispensed with, whereby on the one hand the necessary installation space for the safety device and on the other hand the overall weight of the safety device is reduced.

In a further formation, it can be provided for that the leg lies adjacent alternately on the striker and the rotary latch during rotation of the rotary latch in the opening direction of rotation. Alternating means that the leg lies adjacent to the striker at least in a first position of the rotary latch and a contact between the leg and the rotary latch is canceled and in a second position of the rotary latch in which the rotary latch is rotated from the first position in the opening direction of rotation, the leg lies adjacent to the tappet of the rotary latch and a contact is canceled between the striker and the leg. By means of such an adjacency change of the leg, it can be enabled that during rotation of the rotary latch in the opening direction of rotation, preferably starting from the main locking position, via the pre-locking position to the open position, the leg can cross a larger circular sector, compared to an embodiment in which no adjacency change of the leg is provided for.

The larger the circular sector of the leg crossed, the greater the work put out by the ejection spring during rotation of the rotary latch in the opening direction of rotation. The greater the work put out by the ejection spring during a constant overall stroke of the striker during ejection, the greater a force impact transmitted by the ejection spring directly or indirectly on the striker during ejection. Thus, a safety device, which provides for an ejection spring alternately lying adjacent on the striker and the rotary latch, can be equipped with a smaller dimensioned ejection spring, whereby the installation space and the weight of the safety device can be reduced.

According to an advantageous configuration, the leg is formed such that during an adjacency change of the leg from the striker to the rotary latch, traction is achieved between the leg and the striker.

In order to enable this in detail, the leg can have a curvature, whereby a relative speed is reduced between the striker and the leg during rotation of the leg. A thus reduced relative speed between the striker and the leg can increase duration of the adjacency change of the leg from the striker to the rotary latch, whereby the traction between the leg and the striker is ensured during adjacency change.

The traction between the leg and the striker occurs during adjacency change on the one hand directly by means of direct contact between the leg and the striker and on the other hand indirectly starting from a direct contact between the leg and rotary latch respectively the tappet of the rotary latch by means of direct contact of the striker with the infeed section of the rotary latch. The traction during adjacency change can on the one hand provide a continual opening movement of the striker during movement of the rotary latch in the opening direction of rotation which guarantees increased convenience for an operator of a front hood to be opened. On the other hand, the traction between the leg and the striker during adjacency change can also reduce the noise during ejection of the striker.

In an especially preferred embodiment, the leg has at least a first section curved to the pivot axis of the ejection spring in a first plane vertically to the pivot axis of the ejection spring. The first section is concave, i.e. curved inwards, whereby the internal side starting from the leg is defined by the side on which the pivot axis of the ejection spring is located. Very advantageously, the first section lies adjacent on the striker in the main locking position of the rotary latch.

The concave curvature of the first section of the leg can cause a stroke section of the striker for each covered pivot angle of the leg, described hereafter as a relative stroke section of the striker, compared to a variant in which the leg has a straight first section, to be reduced.

The reduced relative stroke section of the striker during pivoting of the leg in the opening direction of rotation causes the work per stroke section of the striker put out by the ejection spring to be increased and thus, the spring force of the ejection spring acting on the striker to be increased. Thus, in the case of a safety device with an ejection spring with a leg with a first curved section the ejection springs can have smaller dimensions, whereby the weight and the necessary installation space of the safety device can be reduced. Furthermore, during springing of the rotary latch the reduced relative stroke section can enable increased energy input of the ejection spring for each stroke section covered, whereby the safety of the safety device is increased. This advantage can be guaranteed especially well if the striker lies adjacent to the first section in the main locking position.

In a preferred configuration, it is provided for that the first section of the leg in the main locking position has an almost horizontal alignment and lies adjacent to the striker. The alignment is specified by means of a connecting line between a start and an end of the first section, where the first section extends along the leg.

The almost horizontal alignment of the first section of the leg in the main locking position relates in particular to a state of the safety device in which it is installed into a motor vehicle. In the installed state, an exactly horizontal line runs parallel to a vehicle lengthwise axis of the motor vehicle. Almost horizontal means that the connecting line includes an angle of at least less than 20 degrees, preferably less than 15 degrees, with the motor vehicle lengthwise axis. Especially advantageously, the horizontal first section of the leg borders a coil of the ejection spring.

The almost horizontal alignment of the first section of the leg in the main locking position can cause, during initial rotation of the leg, a normal force which acts from the leg to the striker being aligned upwards almost vertically, especially vertically to the motor vehicle lengthwise axis and cause almost the entire normal force to work against a weight force transmitted via the striker. This can enable the ejection spring to drive the rotary latch in the opening direction of rotation and it can preferably be of smaller dimensions to eject the striker. Furthermore, the almost horizontal alignment of the first section has an increased energy intake of the ejection spring for each stroke section covered, whereby the safety of the safety device is increased. This advantage can be guaranteed especially well if the striker lies adjacent to the first section in the main locking position.

In a preferred embodiment, it is provided for the leg having in the first plane or a second plane vertically to the pivot axis of the ejection spring at least a second section adjacent to the first section, where the second section has a curvature oriented opposite to the first section. In this configuration, the second section is convex, i.e. curved outwards, where the outer side is defined by the side which, viewed from the leg, lies opposite the side where the pivot axis of the ejection spring is located.

The convex curvature of the second section can cause an increase in the relative stroke section of the striker for each pivot angle of the leg. Such an increase in the relative stroke section of the striker causes acceleration of the striker, which is caused by ejection of the ejection spring, to be reduced in the second section is reduced. Lesser acceleration of the striker in the second section increases the time in which the striker strikes along the section of the leg.

The striker preferably lies adjacent on the second section of the leg during adjacency change of the leg from the striker to the rotary latch. By means of the reduction of the acceleration of the striker attained by means of the convex curvature of the second section, a period in which the adjacency change is accomplished can be increased. An increase in this period can on the one hand facilitate adjustment of the tappet to the geometry of the leg on one configuration of the safety device and on the other hand reduce noise during adjacency change and ensure traction between the leg and the striker.

In a preferred embodiment, it is provided for the leg having in the first plane, the second plane or a third plane vertically to the pivot axis of the ejection spring at least a third section adjacent to the second section, where the third section has a curvature oriented opposite to the second section. The curvature of the third section is oriented equally to the curvature of the first section, i.e. it is concave. The concave curvature of the third section can equivalently reduce a stroke section of the tappet for each covered pivot angle of the leg as the concave curvature of the first section can reduce a relative stroke section of the striker. The torque acting on the rotary latch by the ejection spring can thus be increased, whereby the ejection spring can have smaller dimensions.

The curvatures of the first, second and/or third section can run constantly via a length of the leg in one configuration in relation to the amount. In another embodiment, the amounts of the respective curvatures can vary over the length of the leg.

Furthermore, a procedure to operate the safety device is proposed. The procedure has at least the following steps.

The rotary latch is pivoted in a closing direction of rotation in a first step. In a second step, the blocking element is moved into the blockage position. In a third step, the rotary latch is decelerated by means of the blocking element. In a fourth step, the blocking element is moved into the release position. In a fifth step, the protective position, which is simultaneously the bolting position of the safety device, is provided. This sequence of the steps constitutes a preferred configuration of the procedure.

A further formation of the procedure can provide for the rotary latch being pivoted from the protective position in a closing direction of rotation in a further sixth step. This can be the case in the case of an accident, for example, where an object, in particular a pedestrian, impacts the front hood. In a seventh step, impact absorbing energy is absorbed. The sixth and the seventh step are preferably executed in parallel. The impact absorption energy can be absorbed, for example, by tensioning of the ejection spring beyond the position in which this is assumed in the main locking position, in the closing direction of rotation. In a further formation, the impact absorption energy can be absorbed by an additional accident protection element of the safety device, such as foam.

Furthermore, a procedure to open the safety device is proposed, where the procedure has the following steps. In a first step, the pawl is deflected from the locking position. The deflection occurs until the pawl has reached the release position. Deflection of the pawl can be caused by means of an electromotor, for example. In a second step, the rotary latch is rotated in the opening direction of rotation starting from the main locking position, where this is supported by means of the ejection spring. The catch is delayed in a third step. This can occur by means of deceleration of the rotary latch in the closing direction of rotation and/or advantageously by means of a stopping of the rotary latch on the stop surface of the pawl boom. After deflection of the pawl, the pawl is moved in the direction of the locking position in a fourth step. The pawl is preferably driven by the pawl spring. Latching of the catch is provided for in the pre-locking position in a fifth step. This is enabled in particular by the pawl reaching the locking position before the rotary latch assumes the pre-locking position. The sequence of the individual steps of the procedure stated here is a preferred sequence. It is also possible that the rotary latch is delayed after initial movement of the pawl in the direction of the locking position.

In a parallel patent application of the same applicant with the title "Safety device for a motor vehicle with a rotary latch and a pre-locking position and a main locking position", the content of which is also fully made into the object of the original publication of this application with its described technical characteristics, a safety device is described in which a pawl is latched in a pre-locking position of a rotary latch on a catch arm and in a main locking position of the rotary latch on a load arm of the rotary latch. First and foremost, the technical characteristics described in the parallel patent application which enable such latching of the pawl pertain to the original publication of this application. This relates in particular to the possible configurations of the delay mechanism and the procedure for opening the safety device.

In a further parallel patent application of the same applicant with the title "Safety device for a motor vehicle with a rotary latch and an ejection spring", the content of which is also fully made into the object of the original publication of this application with its described technical characteristics, a safety device is described with an adjacency change of a leg of an ejection spring. First and foremost, the technical characteristics described in the parallel patent application which enable an adjacency change of the leg from the striker to the rotary latch, increase of a relative stroke section of the striker and reduction of the relative stroke section of the striker belong to the original publication of this application. This affects in particular the configuration of the rotary latch spring as an ejection spring and the geometric configuration of the leg of the ejection spring.

Other advantages, characteristics and details of the invention result from the following description on the basis of the figures.

Figure 1B:
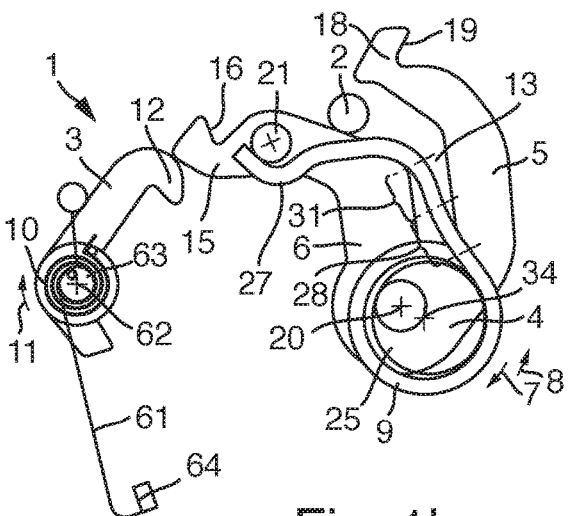
Figure 1C:
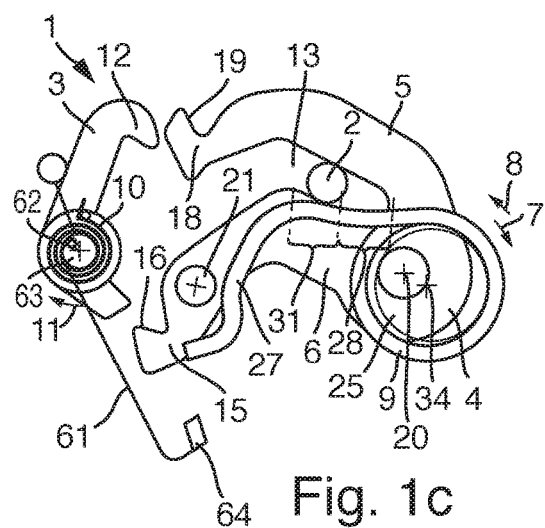
Figure 1D:
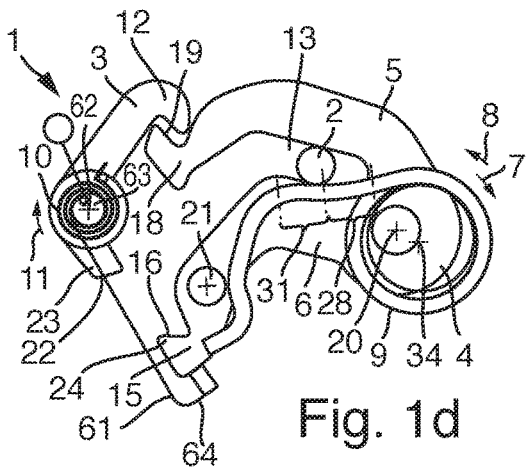
Figure 1E:
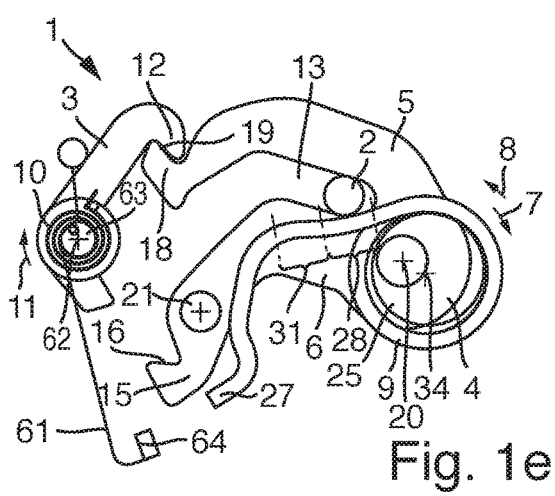
Figure 1F:
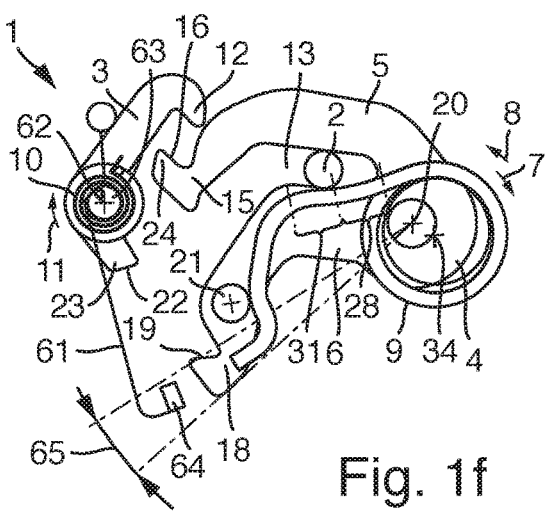
Figure 2A:
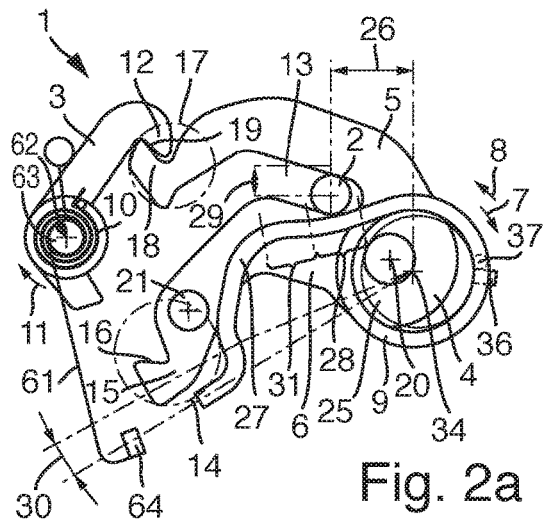
Figure 2B:
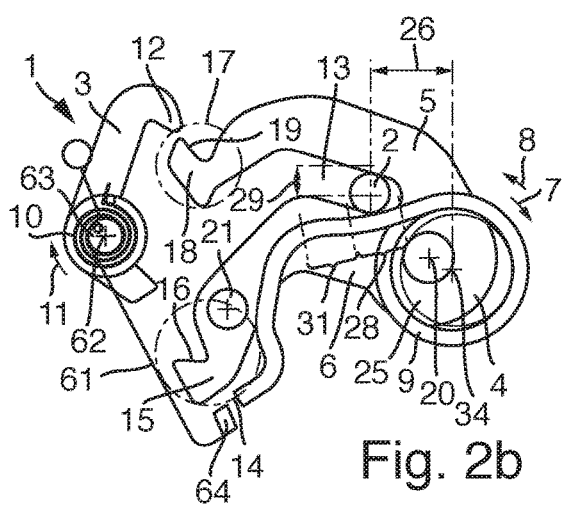
Figure 2C:
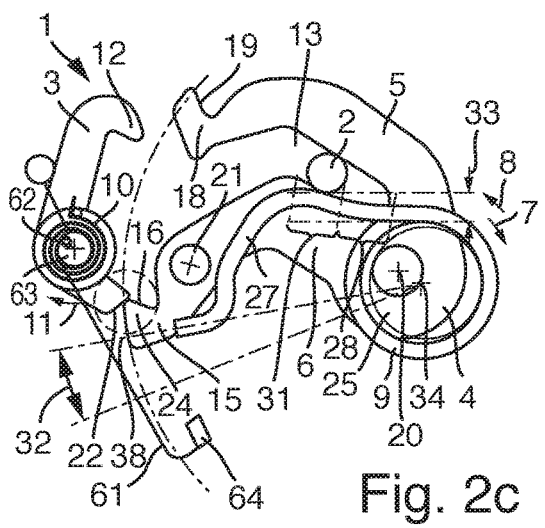
Figure 2D:
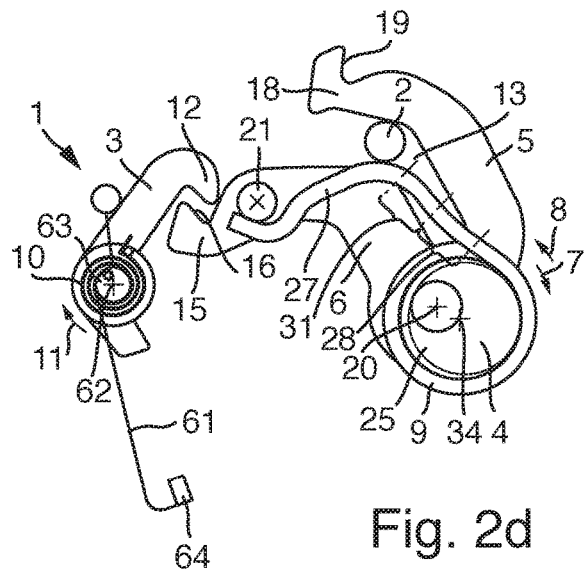
Figure 2E:
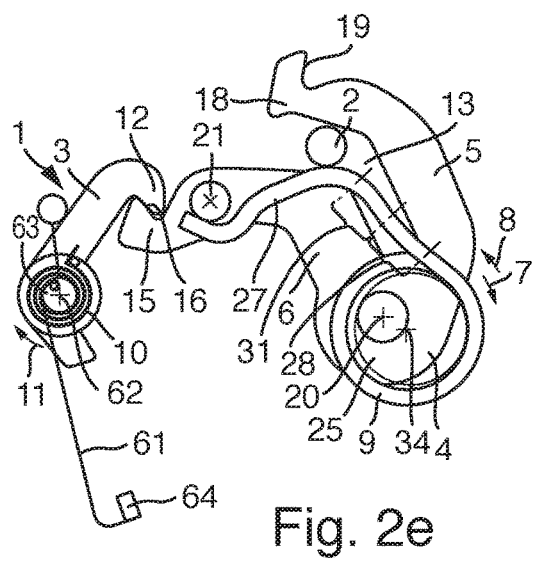
Figure 2F:
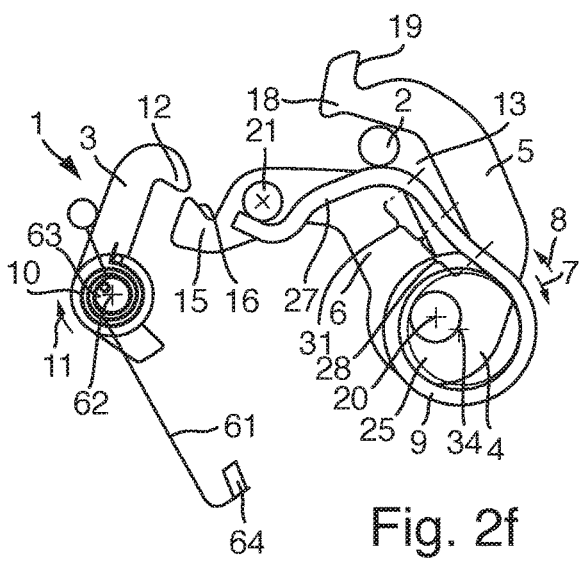
Figure 3:
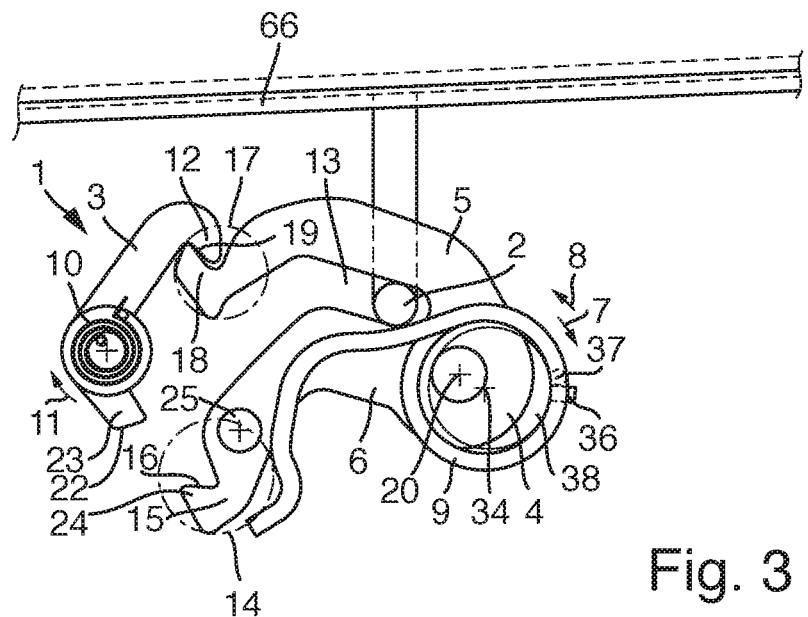
Figure 4:
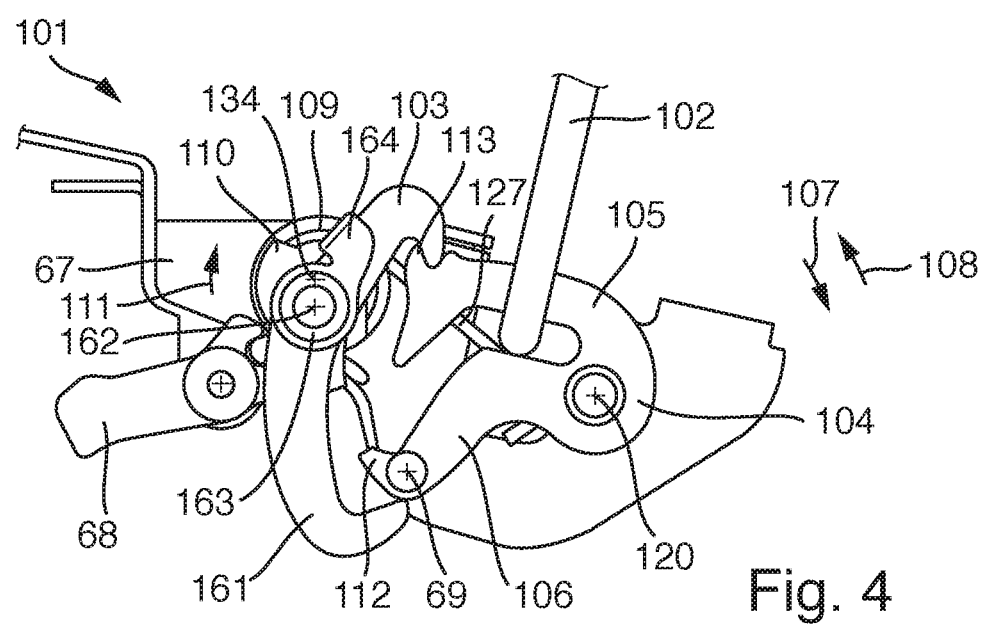
Figure 5:
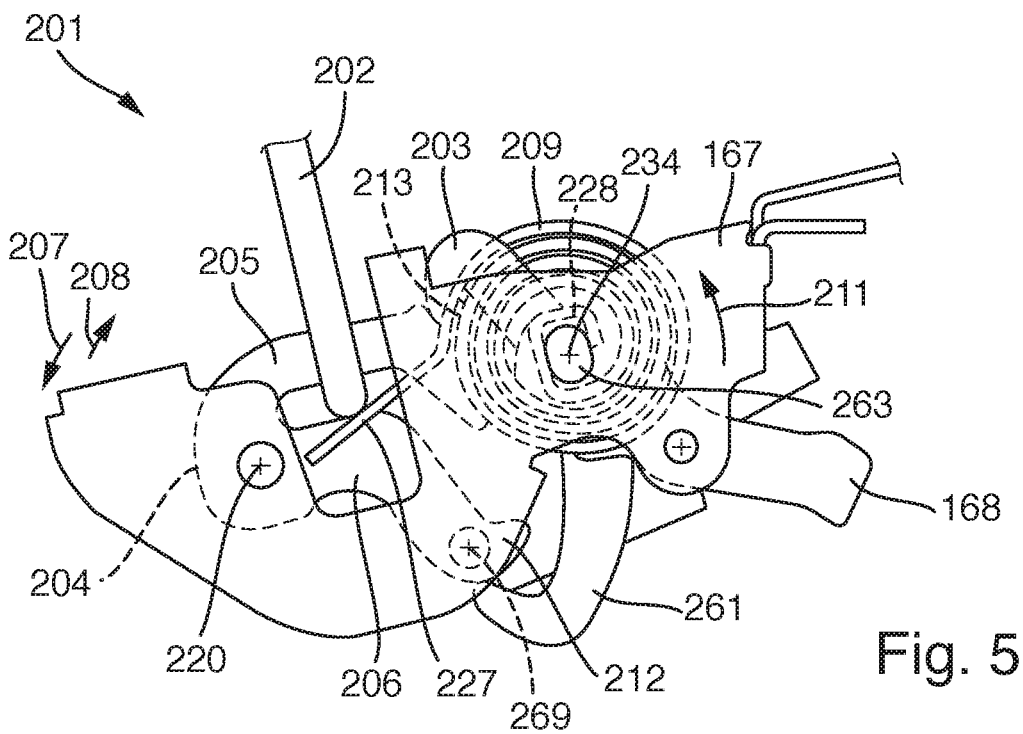
Figure 6:
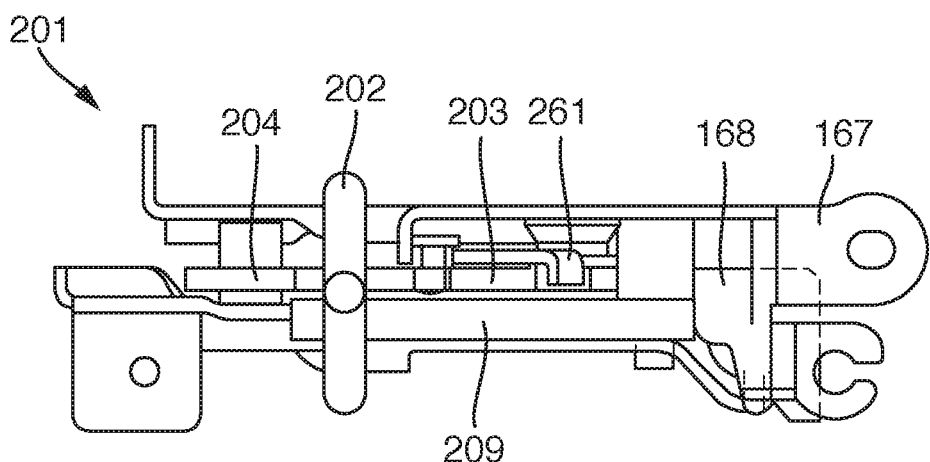

These are demonstrated in:

FIGS. 1a to 1e a sectional view of a safety device during a closing process;

FIG. 1f the safety device according to FIGS. 1a to 1e during lowering of the striker;

FIGS. 2a to 2e the safety device according to FIGS. 1a to 1f during an opening process;

FIGS. 2f the saftey device according to FIGS. 2a to 2e in a passing position;

FIG. 3 the safety device according to FIGS. 1a to 1f and 2a to 2f with a front hood;

FIG. 4 a sectional view of a further safety device;

FIG. 5 a sectional view of a further safety device;

FIG. 6 a top view of a safety device according to FIG. 5.

FIG. 1a shows a safety device 1 for a motor vehicle with a striker 2, a pawl 3 and a rotary latch 4. The rotary latch 4 has a load arm 5, a catch arm 6, an opening direction of rotation 7, a closing direction of rotation 8, a pre-locking position and a main locking position. Furthermore, the safety device 1 has an ejection spring 9 to eject the striker 2, which acts on the rotary latch 4 in the opening direction of rotation 7. The catch arm 6 and the load arm 5 form a fork-shaped infeed section 13 of the rotary latch 4 which accommodates the striker 2. The load arm 5 and the catch arm 4 are formed at least partially arch-shaped in order to enable guidance of the striker 2 within the infeed section 13 during a closure movement and an opening movement of the rotary latch 4.

The catch arm 6 has a head area 14 with a bending tangent 15 in the direction of the opening direction of rotation 7 of the rotary latch 4, whereby the bending tangent 15 forms a pre-ratchet 16. Furthermore, the load arm 5 has a head area 17 with a bending tangent 18 in the direction of the opening direction of rotation 7 of the rotary latch 4, where the bending tangent 18 forms a main ratchet 19. The pawl 3 has a latch nose 12 and a pawl spring 10, which acts on the pawl 3 in a locking direction of rotation 11.

In the pre-locking position of the rotary latch 4 shown in FIG. 1e, the latch nose 12 clasps the pre-ratchet 19 and secures the rotary latch 4 from rotation in the opening direction of rotation 7. Furthermore, the ejection spring 9 acts on the rotary latch 4 by means of the striker 2 in the main locking position of the rotary latch 4 in the direction of the opening direction of rotation 7. By means of this action, the main ratchet 19 is pressed against the latch nose 12 of the pawl 3 and pressure is generated on a contact surface of the latch nose 12 which holds the pawl 3 in a locking position shown in FIG. 1e by means of the force acting via the pawl spring 10.

In the main locking position of the rotary latch 4 shown in FIG. 1e, the safety device 1 assumes a bolting position. In a state of the safety device 1 installed in a motor vehicle the striker 2 is preferably arranged on a front hood, whereby in the bolting position of the safety device 1 the front hood is sealed.

The pawl 3 can be moved against the locking direction of rotation 11 from the locking position shown in FIG. 1e to a passing position, whereby movement of the pawl 3 can preferably be triggered electrically against the locking direction of rotation 11. If the load arm 5 or the catch arm 6 of the rotary latch 4 can be passed in the opening direction of rotation 7 on the latch nose 12 of the pawl 3, the pawl 3 is located in the passing position.

The safety device 1 furthermore has a blocking element 61 which has a blockage position and a release position. The blocking element 61 is shown in the release position in FIGS. 1a and 1b.

FIGS. 1a to 1f show a movement procedure of the safety device 1 during bolting of the safety device 1 and subsequent lowering of the striker 2.

FIG. 1a shows the rotary latch 4 in an opening position in which the striker 2 lies adjacent on the catch arm 6 of the rotary latch 4. In this position, the striker 2 is released by the load arm 5, whereby the striker 2 can engage from above into the infeed section 13. If, starting from the open position of the rotary latch 4 shown in FIG. 1a, the striker 2 is depressed, for example by means of depression of the front hood attached to the striker 2, the rotary latch 4 impacts with the head end 14 of the catch arm 6 on the latch nose 12 of the pawl 3. After the impact, the rotary latch 4 preferably rotates by means of further lowering of the striker 2 into the closing direction of rotation 8 and causes shifting of the latch nose 12 and associated rotation of the pawl 3 in the direction of the passing position.

The blocking element 61 and the pawl 3 are pivotably mounted around a common pivot axis 62. The blocking element 61 is mechanically connected to the pawl 3 indirectly by means of a blocking spring element 63, whereby a spring stiffness of the blocking spring element 63 causes a delay in rotation of the blocking element 61 compared to the pawl 3. The blocking element 61 is indirectly controlled by means of the pawl 3 by means of the blocking spring element 63, in particular driven, whereby rotation of the pawl 3 causes rotation of the blocking element 61. The blocking spring element 63 is executed as a blocking element pivot spring in the configuration shown in FIGS. 1a to 1f.

If the rotary latch 4 rotates from the position shown in FIG. 1b further in a closing direction of rotation 8, the pre-ratchet 16 passes the latch nose 12 of the pawl 3, and the main ratchet 19 nears the latch nose 12, as shown in FIG. 1c. The pawl 3 is located in the passing position and the blocking element 61 in the blockage position in FIG. 1c. An advantageous configuration envisages that the spring stiffness of the blocking spring element 63 is adjusted to a mass inertia moment of the blocking element 61 around the pivot axis 62 and on a mass inertia moment of the rotary latch 4 around a pivot axis 20 of the rotary latch 4 that the blocking element 61 moves into the blockage position shown in FIG. 1c driven by the pawl 3, before the bending tangent 15 of the catch arm reaches a stop 64 of the blocking element 61.

In the passing position of the pawl 3 shown in FIG. 1c, the main ratchet 19 can move past the latch nose 12. This enables further lowering of the striker 2 from the position of the striker 2 shown in FIG. 1c to the position of the striker 2 shown in FIG. 1d.

FIG. 1d shows the safety device 1 in a penetration protective position in which the bending tangent 15 of the catch arm 6 lies adjacent to the stop 64 of the blocking element 61. In the penetration protective position of the safety device 1 the blocking element 61 assumes the blockage position and blocks the rotary latch 4 in the closing direction of rotation 8 by means of the stop 64.

In the embodiment of the safety device 1 shown in FIG. 1*a* to if the blocking spring element 63 causes a delay in the rotation of the blocking element 61 compared to rotation of the pawl 3. For example, in the position of the safety device shown in FIG. 1*c*, the blocking element 61 can move opposite to the locking direction of rotation 11, although the pawl 3 is already rotating in the locking direction of rotation 11.

The safety device 1 advantageously has a tailored inertia system, whereby the blocking spring element 63, a mass inertia moment of the blocking element 61 around the pivot axis 62 of the blocking element 61, a mass inertia moment of the pawl 3 around the pivot axis 62 of the pawl 3 and the pawl spring 10 are tailored to one another such that the pawl 3 has a higher pivot acceleration than the blocking element 61 starting from the passing position shown in FIG. 1*c* into the locking direction of rotation 11. This tailored inertia system enables the pawl 3 to assume the locking position shown in FIG. 1*d* after rotation from the passing position to the locking position and the blocking element 61 is simultaneously located in the blockage position. In this rotation of the pawl 3 in the direction of the locking position, the pawl 3 tensions the blocking spring element 63 into the locking rotational direction 11, while the blocking element 61 remains in the blockage position.

Especially advantageously, the safety device 1 has a contact between the bending tangent 15 of the catch arm 6 and the blocking element 61 or the stop 64 of the blocking element 61 in the penetration protection position, where the contact inhibits rotation of the blocking element 61 in the direction of the release position of the blocking element 61, preferably due to friction.

The blocking spring element 63 is designed as a pivot spring in the embodiment shown in FIG. 1*a* to 1*f*. In a different embodiment, the blocking spring element 63 can also be formed as an elastic composite element, which combines the stop 64 with the pawl 3. In this variant, the stop 64 and the blocking spring element 63 form the blocking element 61.

Starting from the penetration protection position of the rotary latch 4 shown in FIG. 1*d* the rotary latch 4 moves after deceleration by means of the stop 64 in the opening direction of rotation 7 in the direction of the main locking position, where the rotary latch 4 is acted on by the ejection spring 9 in the opening direction of rotation.

If the rotary latch 4 is located in the main locking position shown in FIG. 1*e*, a contact is canceled between the bending tangent 15 of the catch arm 6 and the blocking element 61.

The blocking spring element 63 tensioned in the locking direction of rotation 11 accelerates, starting from the blocking position of the blocking element 61 shown in FIG. 1*d*, the stop 64 and thus the blocking element 61 in the locking direction of rotation 11 to the release position of the blocking element 61. By means of the tensioning of the blocking spring element 63 during movement of the pawl 3 from the passing position to the locking position the blocking element 61 is controlled and driven indirectly by means of the pawl 3.

In the release position of the blocking element 61, the rotary latch 4 is released from the blocking element 161 in the closing direction of rotation 8 and enables lowering of the striker 2.

The lowering of the striker 2 is, starting from the main locking position of the rotary latch 4, shown in FIG. 1*f*. In an impact absorption position shown in FIG. 1*f* of the safety device 1 the rotary latch 4 is rotated by lowering of the striker 2 in the closing direction of rotation 8 into an impact absorption position. In this impact absorption position of the rotary latch 4 the ejection spring 9 is tensioned further in the closing direction of rotation 8 than in the main locking position of the rotary latch 4, whereby impact absorption energy is stored in the ejection spring 9.

The safety device 1 can, starting from the protective position of the safety device 1 shown in FIG. 1*e*, absorb the impact absorption energy by means of the ejection spring 9 without an actuator, a pyrotechnic actuator for example, being actuated. The safety device 1 together with the main locking position of the rotary latch 4 thus provides the protective position of the safety device 1, whereby the safety device 1 assumes a normal bolting state.

The safety device 1 provides an impact absorption pivot angle sector 65 with the impact absorption position of the rotary latch 4 in which the rotary latch 4 can be pivoted in the closing direction of rotation 8 via the main locking position, where lowering of preferably approximately 15 mm of the striker 2 or the front hood attached to the striker 2 is associated with a rotation of the rotary latch 4 into the impact absorption pivot angle sector 65.

FIGS. 2*a* to 2*f* show the safety device 1 during an opening process; In the main locking position of the rotary latch 4 shown in FIG. 2*a*, it is especially advantageous to be able to trigger a movement of the pawl 3 from the locking position to the passing position by means of an electrical drive. FIG. 2*b* shows the pawl 3 in the passing position in which the bending tangent 18 of the load arm 5 can be passed on the latch nose 12. In the passing position of the pawl 3 the ejection spring 9 accelerates the striker 2 upwards, whereby the striker 2 lies directly adjacent on the load arm 5 of the rotary latch 4 and rotates the rotary latch 4 in the opening direction of rotation 7 by means of its movement upwards. A special embodiment can be provided for that the electrical drive moves the pawl 3 from the locking position for a short time and an effect of the electrical drive on the pawl 3 is canceled directly after reaching the passing position of the pawl 3.

Where possible, a spring stiffness of the pawl spring 10 is adjusted to the spring stiffness of the ejection spring 9, such that during release of the rotary latch 4 latching into the pre-locking position is ensured from the main locking position.

Such an adjustment of the spring stiffness of the pawl spring 10 provides in particular for the pawl spring 10 exerting at least such a pivot acceleration on the pawl that the pawl 3 moves back from the passing position in a timely manner into the locking position, before the catch arm 6 can pass the latch nose 12.

In addition or alternatively to this adjustment of the spring stiffness of the pawl spring 10, the safety device 1 can have a delay mechanism 38. The delay mechanism 38 is shown in FIG. 2*c* and formed as a stop surface 22 at one end of a boom 23 of the pawl 3 and a chock-shaped end 24 of the bending tangent 15 of the catch arm 6.

The delay mechanism 38 is configured such that in the passing position of the pawl 3 and during rotation of the rotary latch 4 starting from the main locking position into the opening direction of rotation 7 a trajectory 35 of a tip of the chock-shaped end 24 intersects the stop surface 22 of the boom 23. During impacting of the chock-shaped end 24 on the stop surface 22 the rotation of the rotary latch 4 is stopped in the opening direction of rotation 7. By stopping the rotary latch 4 it is possible for the pawl spring 10 to move the pawl 3 into the locking position, before the bending tangent 15 of the catch arm 6 can pass the latch nose 12. Compared to a variant in which the rotary latch 4 is not stopped by means of the delay mechanism 21, the pawl spring 10 can have smaller dimensions as more time is available to move the pawl 3 from the passing position into the locking position.

FIG. 2d shows the rotary latch 4 in an intermediate position between the main locking position and the pre-locking position in which a boom of the ejection spring 9 lies adjacent both on the striker 2 and also on a tappet 21 which is arranged on the catch arm 6. After reaching this intermediate position of the rotary latch 4 the ejection spring 9 acts on the rotary latch 4 directly by means of the tappet 21 into the opening direction of rotation 7.

FIG. 2e shows the rotary latch 4 in the pre-locking position in which the latch nose 12 encompasses the bending tangent 15 of the catch arm 6. In this pre-locking position, a rotation of the rotary latch 4 is blocked by means of the pawl 3 in an opening direction of rotation 7. The rotary latch 4 can be loosened from the pre-locking position by means of rotation of the pawl 3 from the locking position into the passing position, as shown in FIG. 2f. Starting from the position shown in FIG. 2f of the rotary latch 4 the ejection spring 9 moves the rotary latch 4 further in the opening direction of rotation 7 to an open position of the rotary latch 4 shown in FIG. 1a, whereby the striker 2 is lifted further. According to the opening process of the safety device 1 shown in FIGS. 2a to 2f and FIG. 1a, the pawl spring 10 moves the pawl 3 back into the locking position which is shown in FIG. 1a.

FIG. 3 shows a front hood 66 arranged on the striker 2, as can be provided for, for example, in the safety device 1 located in a state installed in a motor vehicle. The safety device 1 is preferably arranged in a front area of the front hood 66. Alternatively, the safety device 1 can be arranged in a rear area of the front hood 66. The front hood 66 and the striker 2 arranged on the front hood 66 assume in the main locking position of the rotary latch 4, which is shown in FIG. 1e or in FIG. 2a and the protective position of the safety device 1, the positions respectively illustrated in dot dashes in FIG. 3. In the impact absorption position of the rotary latch 4 and the safety device 1, shown in FIG. 3 and in FIG. 1f, the front hood 66 and the striker 2 are lowered, as illustrated in FIG. 3 by means of solid lines. The blocking element 61 is not included in FIG. 3 to simplify the illustration.

The ejection spring 9 is formed as a leg spring, where the ejection spring 9 has a leg 27 and main spring material, which gives the ejection spring 9 spring stiffness. The main spring material is preferably metal. In the embodiment shown in FIG. 2a, it is provided for that the striker 2 lies adjacent on the leg 27, preferably on the main spring material, in the main locking position. A deviating configuration which is still within the scope of the invention provides for the main spring material being equipped with a protective cover, where the protective cover can be considered to be part of the leg 27. In this case, in the main locking position, the leg 27 also lies adjacent to the striker 2.

FIG. 1a shows the rotary latch 4 in the open position. FIG. 2d shows the rotary latch 4 in an intermediate position in which the rotary latch 4 is located between the main locking position and the open position and is pivoted into the opening direction of rotation 7 starting from the main locking position. In the intermediate position, the leg 27 acts directly on the rotary latch 4 on a tappet 21 of the rotary latch 4. In a special configuration, the tappet 21 is part of the surface of the catch arm 6. In any case, the tappet 21 is connected to the catch arm 6 in a form-fitting and interlocking manner, so that direct adjacency of the leg 27 to the tappet 21 corresponds to direct adjacency of the leg to the rotary latch 4.

In the open position of the rotary latch 4 shown in FIG. 1a, the leg 27 acts on the rotary latch 4 also directly in the opening direction of rotation 7. Furthermore, a contact is canceled between the striker 2 and the leg 27 in this position.

As the leg 27 lies directly adjacent to the rotary latch 4 in the open position of the rotary latch 4, the rotary latch 4 is acted on in the opening direction of rotation 7, and the catch arm 6 is kept pressed against the striker 2. Thus, by means of the ejection spring 9a lifting force can be transferred to the striker 2 and contact can be ensured between the catch arm 6 and the striker 2 in the open position of the rotary latch 4.

Maintenance of a contact between the catch arm 6 and the striker 2 can reduce noise during ejection of the striker 2 in contrast to a configuration in which the leg 27 lies adjacent to the striker 2 in the open position and can cause stopping of the striker 2 on an internal surface of the load arm 5.

Furthermore, a lifting force acting directly on the rotary latch 4 during opening of the rotary latch 4 to the open position can enable enlargement of a stroke section 39 of the striker 2 in contrast to a variant in which the leg 27 only lies adjacent on the striker 2 during opening of the rotary latch 4. An increase in the stroke section 39 increases operator convenience of a front hood connected to the striker 2 to the extent that an engagement area between an edge of the front hood and a further edge of a chassis of the motor vehicle located thereunder is increased, whereby grasping of the front bonnet is facilitated.

In the embodiment of the safety device 1 shown in FIGS. 1a to 1f and 2a to 2f, the ejection spring 9 has a pivot axis 34, which is arranged in a displaced manner to the pivot axis 20 of the rotary latch 4. The ejection spring 9 preferably has a fixed end 36, which is braced on a static support 37 of the safety device 1. The fixed end 36 advantageously extends to a bearing socket 25 and surrounds the bearing socket 25, such that the fixed end 36 is immobile in relation to the pivot axis 34 of the ejection spring 9. A lever arm 26 which extends between the central point of the striker 2 and the pivot axis 34 of the ejection spring 9, and is enlarged by means of the displaced pivot axes 34 and 20 compared to a safety device in which the ejection spring 9 and the rotary latch 4 have a common pivot axis. The enlarged lever arm 26 can advantageously increase energy intake of the ejection spring 9 during lowering of the rotary latch 4 from the main locking position into the impact absorption position, whereby the safety of the safety device can be further increased. In a different configuration, the rotary latch 4 and the ejection spring 9 have a common pivot axis. This has the advantage of a more compact design and weight saving.

Hereafter, the image plane of FIG. 2a is viewed which is aligned vertically to the pivot axis 34 of the ejection spring 9 and constitutes a first plane. The leg 27 of the ejection spring 9 has a first section 28, which is curved in the first plane to the pivot axis 34 of the ejection spring 9 and preferably lies adjacent to a coil of the ejection spring 9.

The first section 28 is concave, i.e. curved inwards, whereby the internal side in relation to the leg 27 is defined by the side on which the pivot axis 34 of the ejection spring 9 is located. The first section 28 lies adjacent on the striker in the main locking position of the rotary latch 4 illustrated in FIG. 2a. The concave curvature of the first section 28 of the leg 27 can cause a stroke section 29 of the striker 2 for each covered pivot angle 30 of the leg 27, referred to hereafter as relative stroke section of the striker 2, to be reduced compared to a variant in which the leg 27 has a straight first section 28 during rotation of the leg 27, starting from the main locking position of the rotary latch 4 in the opening direction of rotation 7.

The reduced relative stroke section of the striker 2 during pivoting of the leg 27 in the opening direction of rotation 7 can cause the work per stroke section of the striker 2 put out by the ejection spring 9 to be increased and thus, the spring force of the ejection spring 9 acting on the striker to be increased. Thus, in this configuration shown in FIG. 2*a* the ejection spring 9 can have smaller dimensions, whereby the weight and the necessary installation space of the safety device 1 can be reduced. FIG. 2*a* furthermore shows that the first section 28 includes an angle of approximately 12 degrees with a horizontal line in the image plane of FIG. 1*a*, i.e. is aligned almost horizontally.

Furthermore, the leg 27 has a second section 31 lying adjacent to the first section 28, whereby the second section 31 has a curvature oriented opposite the first section 28. The second section 31 is convex, i.e. curved outwards, where the outer side is defined by the side which, viewed from the leg 27, lies opposite the side on which the pivot axis 34 of the ejection spring 9 is located.

The convex curvature of the second section 31 can cause an increase of the relative stroke section of the striker 2, whereby acceleration of the striker 2, which is caused by the ejection spring 9, can be reduced if the striker 2 glides along the second section 31. As explained in the general description, reduction of the acceleration of the striker in the second section 31 can cause a noise during adjacency change.

An adjacency change of the leg 27 during evaluation of the striker 2 from adjacency of the leg 27 to the striker 2 to an adjacency of the leg 27 to the rotary latch 4 is described hereafter. Starting from the main locking position of the rotary latch 4 shown in FIG. 2*a*, the pawl 3 is transferred into the passing position from the locking position, preferably by means of an electrical drive. The rotary latch 4 released in the opening direction of rotation 7 is accelerated by means of the ejection spring 9 via a contact between the striker 2 and the load arm 5 and pivoted into the position shown in FIG. 2*c*.

FIG. 2*c* shows the rotary latch 4 in a position between the main locking position and pre-locking position shown in FIG. 2*e*. Compared to the position of the rotary latch 27 shown in FIG. 2*b*, the leg 27 is pivoted around an angle 32 in the opening direction of rotation 7 and the striker 2 is lifted upwards around a stroke section 33. A relative stroke section of the striker 2 can be calculated, for example, in the position of the rotary latch 4 shown in FIG. 2*c* from the quotient of the stroke section 33 as a numerator and the covered pivot angle 32 of the leg 27 as a denominator. In the position of the rotary latch 4 shown in FIG. 2*c*, the leg 27 lies adjacent to the striker 2, however not to the rotary latch 4 or the tappet 21. Furthermore, in the position of the rotary latch 4 shown in FIG. 2*c* the bending tangent 15 is blocked by the stop surface 22 of the boom 23 of the pawl 3. Following such a blockage, the pawl 3 rotates acted on by the pawl spring 10 into the locking position which is shown in FIG. 2*d*, whereby the blockage is canceled by the boom.

Starting from the position of the rotary latch 4 shown in FIG. 2*c*, the rotary latch 4 is rotated by means of the ejection spring 9 via the striker 2 and a contact between the striker 3 and the load arm 5 in the opening direction of rotation 7.

Shortly before attainment of the pre-locking position of the rotary latch 4, preferably roughly with a pivot angle of 2 to 5° before attainment, the leg 27 lies adjacent to the tappet 21. Simultaneously, the leg 27 lies adjacent on the striker 2. The second curved section 31 extends preferably by means of the edges shown in the Figures in the direction of the open end of the leg 27 and, in this embodiment, is always convexly curved such that the leg 27 lies adjacent directly during further rotation of the rotary latch 4 both to the striker 2 and also to the tappet 21. Thus, a relative speed between the leg 27 and the tappet 21 can be reduced almost to zero during impacting of the leg 27 on the tappet 21, whereby a noise is reduced during impacting of the leg 27 on the tappet 21.

FIG. 2*e* shows the rotary latch 4 in the pre-locking position, whereby the pawl 3 blocks the catch arm 6 and thus the rotary latch 4 in the opening direction of rotation 7. In the pre-locking position, the leg 27 lies directly adjacent both on the striker 2 and also on the tappet 21 and thus on the rotary latch 4. Starting from the pre-locking position of the rotary latch 4 shown in FIG. 2*e*, the pawl 3 is rotated from the locking position into the passing position. This can preferably occur manually. In the passing position of the pawl 3 the rotary latch 4 is released in the opening direction of rotation 7 and is accelerated via direct contact between the leg 27 and the tappet 21 by means of the ejection spring 9 into the opening direction of rotation 7, as shown in FIG. 2*f*.

FIG. 1*a* shows the rotary latch 4 in the open position in which the rotary latch 4 is pivoted in the opening direction of rotation compared to the position shown in FIG. 2*f*. In the open position, a contact is canceled between the leg 27 and the striker 2 and the leg 27 lies adjacent to the tappet 21.

The movement process shown, starting from FIG. 2*c* via FIG. 2*d*, FIG. 2*e*, FIG. 2*f* to FIG. 1*a*, shows an adjacency change of the leg 27 from the striker 2 to the rotary latch 4, where the leg 27 is formed such that traction is achieved between the leg 27 and the striker 2. In all of the positions of the rotary latch 4 attained during adjacency change, traction is provided for between the leg 27 and the striker 2, either by means of direct contact between the leg 27 and the striker 2 or by means of direct contact of the leg 27 with the tappet 21 in conjunction with direct contact between the catch arm 6 and the striker 2.

This adjacency change causes the leg 27 of the ejection spring 9 to cover a greater angle area than the rotary latch 4 during adjacency change. This has the advantage that, compared to a variant without such adjacency change, the ejection spring 9 is relaxed more greatly, whereby the ejection spring 9 puts out greater work directly or indirectly on the striker 2. This has the advantage that the ejection spring 9 can have smaller dimensions and the installation space and weight of the safety device 1 can thus be reduced.

FIG. 4 shows a sectional view of a further configuration of a safety device 101 with a striker 102, a pawl 103 and a rotary latch 104, where the rotary latch 104 has a catch arm 106 with a pre-ratchet 112, a load arm 105 with a main ratchet 113, an opening direction of rotation 107, a closing direction of rotation 108, a pre-locking position and a main locking position and is located in the main locking position in FIG. 4. Apart from the striker 102, almost all parts of the safety device 101 are preferably arranged on a lock case 67, where the lock case 67 is installed in an installed state of the safety device 101 statically in a motor vehicle. This also applies preferably to the safety device 1. The safety device 101 furthermore has an ejection spring 109 with a leg 127 to eject the striker 102, which acts on the rotary latch 104 in the opening direction of rotation 107. The pawl 103 has a pawl spring 110 which acts on the pawl 103 in a locking direction of rotation 111. In the pre-locking position of the rotary latch 104 the pawl 103 clasps the pre-ratchet 112 and is thus latched on the catch arm 106. In the main locking position of the rotary latch 104 the pawl 103 clasps the main ratchet 113 and is thus latched onto the load arm 105.

In contrast to the configuration of the safety device 1 shown in FIGS. 1 to 1f, 2a to 2f and FIG. 3, the striker 102 is arranged in the main locking position of the rotary latch 104 between a pivot axis 134 of the ejection spring 109 and a pivot axis 120 of the rotary latch 104. This has the advantage of a simpler embodiment compared to the configuration shown in FIG. 1a. The embodiment shown in FIG. 4 furthermore provides in a preferred variant for the ejection spring acting on the striker 102 directly during movement of the rotary latch 104 from the main locking position into the opening direction of rotation 107 to an open position in which the striker 102 is released by the rotary latch 104.

The safety device 101 furthermore has a blocking element 161 which has a blockage position and a release position. In the blockage position of the blocking element 161 the rotary latch 104 is blocked in the closing direction of rotation 108. In the release position of the blocking element 161, the rotary latch 104 is released from the blocking element 161 in the closing direction of rotation 108 and enables lowering of the striker 102. Movement of the blocking element 161 from the release position into the blockage position is controlled by means of the pawl 103. The safety device 101 also has a blocking spring element 163, where the blocking spring element 163 can, for example, be a pivot spring or an elastic connecting element between the pawl 103 and the blocking element 161 and enables indirect driving of the blocking element 161 by means of the pawl 103. Furthermore, the safety device 101 has a tappet 164 by means of which the blocking element 161 can be driven against the locking direction of rotation 111 by means of the pawl 103.

The rotary latch 104, the ejection spring 109, the pawl 103, the blocking spring element 163 and the blocking element 161 operate together in the same way as the rotary latch 4, the ejection spring 9, the pawl 3, the blocking spring element 63 and the blocking element 61 in FIGS. 1a to 1f. For example, in the blockage position, the blocking element 161 blocks the rotary latch 104 in the closing direction of rotation 108 similarly as shown with the safety device 1 with the blocking element 61 and the rotary latch 4 in FIG. 1d, where the blocking element 161 lies adjacent to a mandrel 69 of the catch arm 106 in contrast to the blocking element 61. The position of the safety device 101 shown in FIG. 4 corresponds to the position of the safety device 1 which is shown in FIG. 1e, only that the blocking element 161 has not yet completely moved in the locking direction of rotation 111 from the blockage position to the release position. A possible variant of this embodiment can provide for the leg 127 in a similar way to the leg 27 having the embodiment shown in FIG. 1a having a first curved section 28 and a second curved section 31, also a first and a second section with respectively comparable curvature radii or curvature radii courses along the leg 127.

Furthermore, the safety device 101 has a triggering lever 68 which interacts with a boom of the pawl 103. A rotation of the triggering lever 68 in the locking direction of rotation 111 causes rotation of the pawl 103 opposite to the locking direction of rotation 111 in the direction of the passing position of the pawl 103. The triggering lever 68 is preferably on the one hand operable electrically to loosen the rotary latch 104 from the main locking position, for example by means of an electromotor, and on the other hand operable manually to loosen the rotary latch 104 from the pre-locking position.

FIG. 5 shows a sectional view of a further configuration of a safety device 201 with a striker 202, a pawl 203 and a rotary latch 204, whereby the rotary latch 204 has a catch arm 206, a load arm 205, an opening direction of rotation 207, a closing direction of rotation 208, a pre-ratchet 212 and a main ratchet 213, a pre-locking position and a main locking position and is located in the main locking position. Apart from the striker 202, almost all parts of the safety device 201 are preferably arranged on a lock case 167, where the lock case 167 is installed in an installed state of the safety device 201 statically in a motor vehicle. The safety device 201 furthermore has an ejection spring 209 with a leg 227 to eject the striker 202, which acts on the rotary latch 204 in the opening direction of rotation 207.

In contrast to the configuration of the safety device 1 shown in FIGS. 1 to 1f, 2a to 2f and FIG. 3, the striker 202 is arranged in the main locking position of the rotary latch 204 between a pivot axis 234 of the ejection spring 209 and a pivot axis 220 of the rotary latch 204. This has the advantage of a simpler embodiment compared to the configuration shown in FIG. 1a. The embodiment shown in FIG. 5 furthermore provides in a variant for the ejection spring 209 acting on the striker 202 directly during movement of the rotary latch 204 from the main locking position in the opening direction of rotation 207 to an open position in which the striker 202 is released by the rotary latch 204.

The safety device 201 furthermore has a blocking element 261 which has a blockage position and a release position. In the blockage position of the blocking element 261 the rotary latch 204 is blocked in the closing direction of rotation 208. In the release position of the blocking element 261, the rotary latch 204 is released from the blocking element 161 in the closing direction of rotation 208 and enables lowering of the striker 202. Movement of the blocking element 261 from the release position into the blockage position is controlled by means of the pawl 203. The safety device 201 also has a blocking spring element 263, where the blocking spring element 263 can, for example, be a pivot spring or an elastic connecting element between the pawl 203 and the blocking element 261 and enables indirect driving of the blocking element 261 by means of the pawl 203.

The rotary latch 204, the ejection spring 209, the pawl 203, the blocking spring element 263 and the blocking element 261 operate together in the same way as the rotary latch 4, the ejection spring 9, the pawl 3, the blocking spring element 63 and the blocking element 61 in FIGS. 1a to 1f. For example, in the blockage position, the blocking element 261 blocks the rotary latch 204 in the closing direction of rotation 208 similarly to as shown with the safety device 1 with the blocking element 61 and the rotary latch 4 in FIG. 1d, whereby the blocking element 261 lies adjacent to a mandrel 269 of the catch arm 206 in contrast to the blocking element 61. The position of the safety device 201 shown in FIG. 5 corresponds to the position of the safety device 1 which is shown in FIG. 1e, only that the blocking element 261 has not yet completely moved in the locking direction of rotation 211 from the blocking position to the release position. A possible variant of this embodiment can provide for the leg 227 in a similar way to the leg 27 having the embodiment shown in FIG. 1a, having a first curved section 28 and a second curved section 31, also a first and a second section with respectively comparable curvature radii or curvature radii courses along the leg 227.

In contrast to the embodiment shown in FIG. 4, in the configuration shown in FIG. 5, the pawl 203, the ejection spring 209 and the blocking element 261 are accommodated around a common pivot axis 234, which enables a more compact design of the safety device 201 and saving of the pivot axis 134 shown in FIG. 4 of the ejection spring 109 and thus enables weight saving. Furthermore, the safety device 201 shown in FIG. 5 in contrast to the safety device 1 and the safety device 101 equipped with a spiral spring as an ejection spring 209 which can enable a narrower design of the safety device 201 compared to the safety devices 1 and 101, in which the ejection springs 9 and 109 are respectively formed as leg springs.

FIG. 6 shows a top view of a safety device 201 according to FIG. 5. In FIG. 6, it is apparent that the ejection spring 209 assumes approximately a breadth as the pawl 203 and the blocking element 261 together assume a breadth. The configuration of the ejection spring 209 as a spiral spring can in particular simplify common accommodation of the pawl 203, the ejection spring 209 and the blocking element 261 on the common pivot axis 234. Hereby, in particular the narrower design of the ejection spring 209 is advantageous in particular as a spiral spring compared to a leg spring, because bearings can be arranged in a bearing pairing for the joint pivot axis 234 more closely and thus the pivot axis 234 can be shorter and a higher bearing load of the pivot axis 234 is enabled to accommodate several components.

FIG. 5 furthermore shows that an internal end 228 of the ejection spring 209 attacks a connecting element 263 and is braced against this. The connecting element 263 advantageously connects the internal end 228 with the pawl 203 and the blocking element 261. A positive-locking connection between the internal end 228 and the pawl is preferably provided for. By means of the connection between the internal end 228 and the pawl 203 the pawl 203 and the ejection spring 209 are preferably mutually supported, whereby additional components can be saved to support the pawl 203 and the ejection spring 209, whereby weight and necessary installation space of the safety device 201 can be saved.

The connecting element 263 preferably connects the blocking element 261 with the ejection spring 209 or with the pawl 203 elastically and in a force-fitting manner. In this configuration, the connecting element 263 can also assume the function of the blocking spring element 163 of the safety device 101 or the blocking spring element 163 of the safety device 101. Thus, the connecting element 263 can on the one hand support the pawl 203 against the ejection spring 209 and, on the other hand, is formed as a blocking spring element. For example, the connecting element 263 can accommodate the pawl 203 and the ejection spring 209 on a first end and the blocking element 261 on a second end and be elastically formed between the two ends.

Furthermore, the safety device 201 has a triggering lever 168 which interacts with a boom of the pawl 203. A rotation of the triggering lever 168 in the locking direction of rotation 211 causes rotation of the pawl 203 opposite to the locking direction of rotation 211 in the direction of the passing position of the pawl 203. The triggering lever 168 is preferably on the one hand operable electrically to loosen the rotary latch 204 from the main locking position, for example by means of an electromotor, and on the other hand operable manually to loosen the rotary latch 204 from the pre-locking position.

The invention claimed is:

1. A safety device for a motor vehicle, comprising:
a striker,
a pawl, a rotary latch having an opening direction of rotation, a closing direction of rotation, and a main locking position, and
a blocking element, which has a blockage position and a release position, wherein the blocking element and the pawl are pivotably mounted around a joint pivot axis, and
wherein the rotary latch is blocked in the closing direction of rotation in the blockage position of the blocking element,
wherein the rotary latch is released in the closing direction of rotation by the blocking element in the release position of the blocking element,
wherein lowering of the striker is enabled in the main locking position of the rotary latch, and
wherein movement of the blocking element from the release position to the blockage position is controlled by the pawl.

2. The safety device according to claim 1, wherein in a position of the rotary latch, in which the rotary latch is rotated from the main locking position in the opening direction of rotation, the blocking element assumes the blockage position and the blocking element assumes the release position in the main locking position of the rotary latch.

3. The safety device according to claim 1, including a pawl spring, which acts on the pawl in a locking direction of rotation, and has a blocking spring element, wherein the blocking spring element in the blocking position causes delayed rotation of the blocking element in the locking direction of rotation.

4. The safety device according to claim 1, further comprising a tailored inertia system, wherein the blocking spring element, a mass inertia moment of the blocking element around a pivot axis of the blocking element, a mass inertia moment of the pawl around a pivot axis of the pawl and the pawl spring are tailored such that the pawl has greater pivot acceleration into the locking direction of rotation in the passing position than the blocking element.

5. The safety device according to claim 1, including an ejection spring with a leg to eject the striker and the leg lies adjacent in the main locking position of the rotary latch to the striker and in an intermediate position of the rotary latch, in which the rotary latch is located between the main locking position and the open position, the leg acts on the rotary latch directly into the opening direction of rotation.

6. The safety device according to claim 1, wherein the leg has a first section and the first section has an almost horizontal alignment in the main locking position and lies adjacent on the striker.

7. The safety device according to claim 1, wherein the safety device has an ejection spring and the ejection spring is formed as a spiral spring.

8. A method to operate a safety device having a striker, a pawl, a rotary latch, and a blocking element, the method comprising:
pivotably mounting the blocking element and the pawl around a joint pivot axis;
rotating the rotary latch in a closing direction of rotation;
moving the blocking element into a blockage position;
braking the rotary latch by the blocking element, wherein the rotary latch is blocked in the closing direction of rotation when the blocking element is in the blockage position;
moving the blocking element into a release position, wherein movement of the blocking element from the release position to the blockage position is controlled by the pawl, and wherein the rotary latch is released in the closing direction of rotation when the blocking element is in the release position; and providing a protective position which is simultaneously a bolting position of the safety device, wherein lowering of the striker is enabled when the rotary latch reaches a main locking position.

9. The method according to claim 8 further comprising:
rotating the rotary latch in the closing direction of rotation from the protective position; and
accommodating impact absorption energy.

10. The method according to claim 8 further comprising:
deflecting the pawl from a locking position;
rotating the rotary latch starting from the main locking position in the opening direction of rotation;
delaying the rotary latch;
moving the pawl in the direction of the locking position; and
latching the rotary latch in a pre-locking position.

* * * * *